(No Model.) 3 Sheets—Sheet 1.

T. F. GAYNOR & W. A. WASHBURNE.
TIME, SPEED, AND DISTANCE INDICATING MECHANISM FOR CYCLES.

No. 598,598. Patented Feb. 8, 1898.

WITNESSES:
Jesse F. Lynch
Caleb M. Heilman

INVENTORS:
Thomas F. Gaynor
Wm. A. Washburne (No Model.) 3 Sheets—Sheet 2.

T. F. GAYNOR & W. A. WASHBURNE.
TIME, SPEED, AND DISTANCE INDICATING MECHANISM FOR CYCLES.

No. 598,598. Patented Feb. 8, 1898.

WITNESSES: Jesse F Lynch, Caleb M Hillman

INVENTORS: Thomas F. Gaynor, Wm. A. Washburne

UNITED STATES PATENT OFFICE.

THOMAS F. GAYNOR, OF BROOKLYN, AND WILLIAM A. WASHBURNE, OF NEW YORK, N. Y., ASSIGNORS OF ONE-EIGHTH TO JULIUS F. SCHIROTT, OF BROOKLYN, NEW YORK.

TIME, SPEED, AND DISTANCE INDICATING MECHANISM FOR CYCLES.

SPECIFICATION forming part of Letters Patent No. 598,598, dated February 8, 1898.

Application filed August 27, 1896. Serial No. 604,129. (No model.)

*To all whom it may concern:*

Be it known that we, THOMAS F. GAYNOR, of Brooklyn, in the county of Kings, and WILLIAM A. WASHBURNE, of New York, in the county of New York, State of New York, citizens of the United States, have invented certain new and useful Improvements in Time, Speed, and Distance Indicating Mechanism for Cycles, of which the following is a specification.

This invention relates to improvements in time, speed, and distance indicating mechanism for cycles; and it consists in the combination of a timepiece and a cyclometer with the wheel of a cycle or some other movable part of a cycle in connection with the wheel in such a manner that any distance that is to be ridden or has been ridden by a cycle-rider may be measured and indicated and the time or speed made during the trip be also indicated and easily read off in a direct reading without necessitating any mathematical calculation, as is usually necessary under ordinary conditions of cycle-riding.

The objects of our invention are to enable a cycle-rider having a cycle provided with our improvement, first, to determine the time it takes to ride any distance; second, the length in miles or a fraction thereof of any distance thus covered, and, third, the speed made in the rate of miles per hour during any interval of time while the cycle is being used, and to attain these results or any one of them in a simple, direct, and complete manner while the cycle is being used, so that they may be duly observed and noted at the time they are being made and registered, or subsequently, as most desirable.

The nature and objects of our invention will be more fully explained hereinafter, and can be better understood by reference to the accompanying drawings, which form part of this specification, and as will be more particularly pointed out in the claims.

Figure 1:
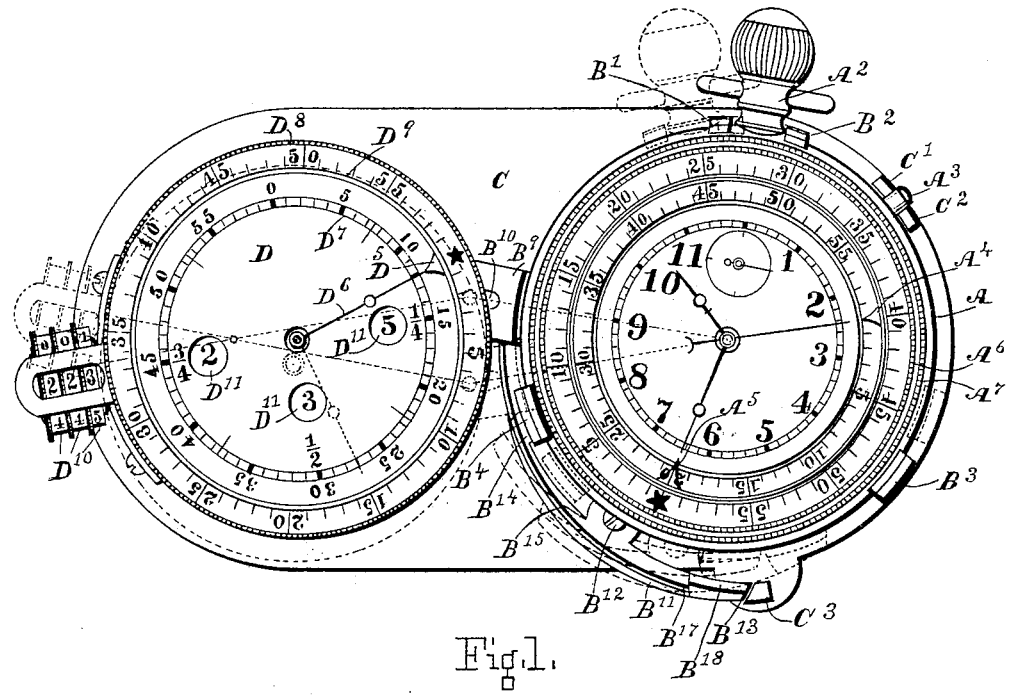
Figure 2:
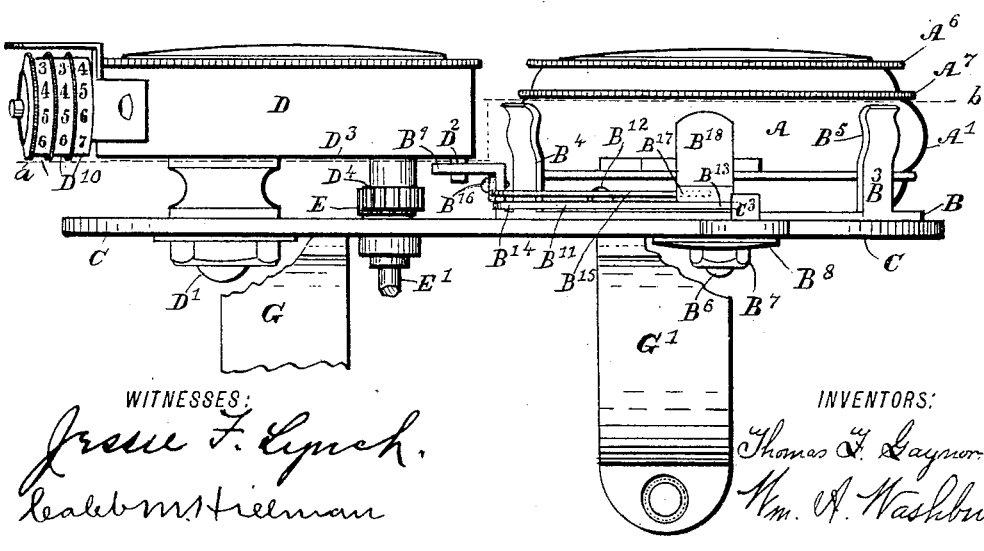
Figure 3:
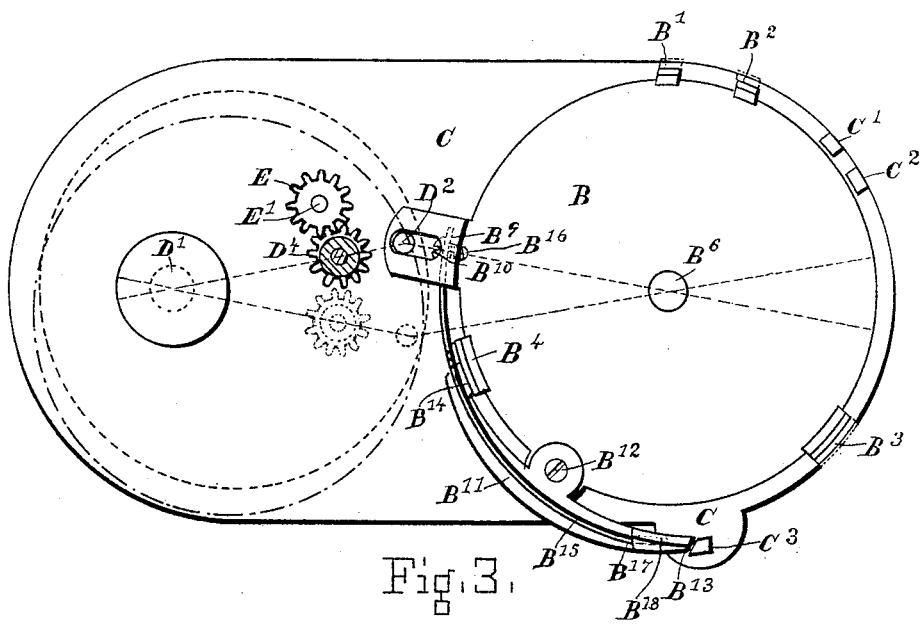
Figure 4:
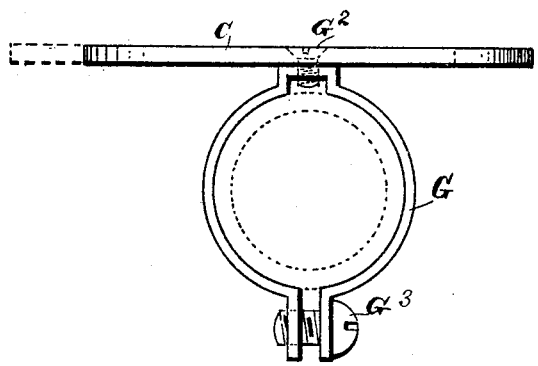
Figure 5:
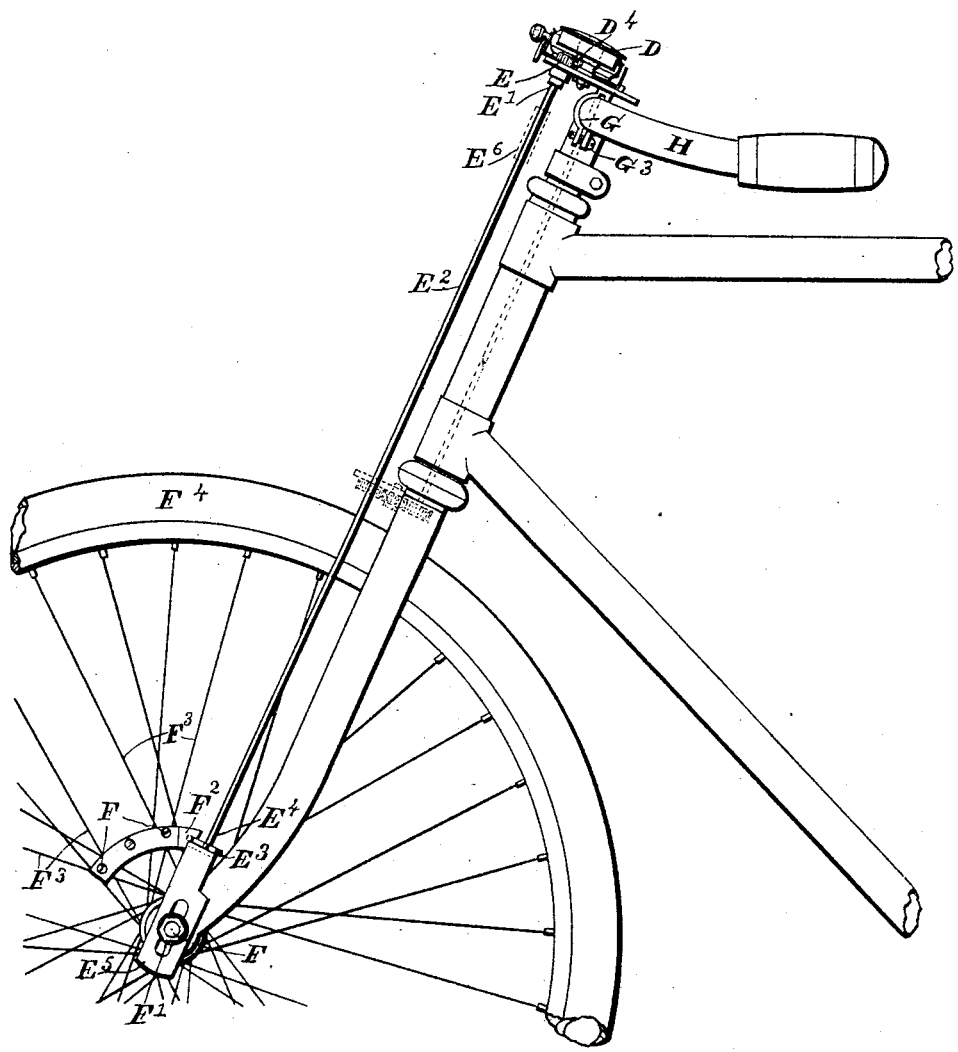

In the drawings, Figure 1 represents a front elevation of our invention and in which are shown a timepiece and a cyclometer, each of an improved design and being connected together, so that their movements may be simultaneous when they are manipulated and which is desirable in attaining the purposes of our invention. Fig. 2 represents the side elevation of Fig. 1 and is intended to show the gear connections between the cyclometer and the cycle-wheel mechanism, and it also shows clip devices by means of which the mechanism is connected with the handle-bar of a cycle. Fig. 3 represents a top sectional view of our device on the line $a\,b$ in Fig. 2, and shows a front view of the timepiece-carrier and its connection with the cyclometer and through which the latter is thrown into or out of gear connection with the cycle-wheel when the carrier is actuated. Fig. 4 represents a side view of one of the clip devices by which our device is secured to the handle-bar of the cycle. Fig. 5 represents a side elevation of our device as connected to the handle-bar of a cycle, and it also shows the gear connections of the device with the wheel of a cycle.

Similar letters refer to similar parts throughout the several views.

In the drawings, A represents a timepiece of a portable size and may be of a watch or small-clock construction and which should be provided with "stop mechanism" of the "timer" or "stop-watch" variety. The timepiece A is secured in position in the carrier B by means of spring-tension fingers B' B² B³ B⁴, which are integral with the carrier B and shaped at B⁵ to grasp a correspondingly-shaped portion A' of the edge of the timepiece A and thereby make a firm but detachable connection with the carrier B. The carrier B is axially pivoted to the base-plate C by means of the threaded pivot B⁶, having a nut B⁷ and spring-tension washer B⁸, by means of which a limited rotary movement of the carrier B may be obtained and to the extent as indicated by the dotted lines in Figs. 1 and 3. The fingers B' B² of the carrier B are adapted to engage with the stem A² of the timepiece A, which is adapted to pass between them and which construction causes the carrier B and the timepiece A to move around together upon the pivot B⁶ of the carrier B, and which movement may be effected either by manipulating the carrier B or the timepiece A at will.

The base-plate C is provided with two (2) fingers C' C², which project upwardly therefrom and which are adapted to engage with the stop device A³ of the timer A and in such a manner as that when the timepiece A and the carrier B are rotated around upon the pivot B⁶ this movement will cause the movement or stoppage of the mechanism of the timepiece, and consequently of its hands, just the same as though the timepiece were held in the hand and the stop device A³ manipulated with the fingers alone. On account of the construction of the stop device A³ with reference to the timepiece A the movement of the former is limited to the arc of a circle indicated by the acute angles of the dotted lines in Figs. 1 and 3 and which would cause the stem of the timepiece when moved to the extremity of its limit of movement to reach the position indicated by the dotted lines in Fig. 1.

The carrier B is provided with an L-shaped slotted finger B⁹, which projects radially from pivot B⁶; and through which engagement is made with the cyclometer D and a slight rotary motion transmitted to the latter around upon its pivot D', by means of which it is pivotally secured to the base-plate C in a manner similar to that in which the carrier B is secured to the latter. The connection between the cyclometer D and the carrier B is made by means of a stud D², which fits loosely in the slot B¹⁰ of the slotted finger B⁹ of the carrier B, which plays in the slot B¹⁰ and which is secured to the bottom D³ of the cyclometer D.

The mechanism of the cyclometer D is actuated through the gear D⁴, and to which movement is transmitted by means of the upper cycle-wheel gear E, which is fitted in a corresponding bearing in the base-plate C and to the upper end E' of the cycle-wheel-gear shaft E², which has also a star-shaped gear E³ secured thereto at its lower end E⁴, and which also has a bearing in the adjustable bracket E⁵, which is secured to the cycle-wheel shaft F by means of the nut F', as is usual for cyclometer devices to be ordinarily connected to cycles. An actuating-finger device F², which is secured to the spokes F³ F³ of the front cycle-wheel F⁴ by means of screws F⁵ F⁵, is connected therewith and in such a relation with reference to the position of the star-shaped gear E³ as that with every revolution of the cycle-wheel F⁴ the actuating-finger F² will engage with the gear E³ and actuate the latter, and thereby transmit motion through the gear-shaft E² and gear E to the cyclometer D through its gear D⁴ whenever its engagement is made with the cycle-wheel gear E, as already explained.

The timepiece A is adapted to indicate any instant of time, as can be expressed by its several hands or index devices and their relative positions upon its dial, and is provided with auxiliary indexes A⁴ A⁵ for the seconds-hand and minute-hand, respectively, and which can be manipulated by means of the bezels A⁶ A⁷, respectively, which have an adjustable connection with the timepiece for the purpose.

The nature and purposes of a timepiece constructed with auxiliary-index mechanism can be more fully understood by reference to another application for Letters Patent for an improvement in "Auxiliary-index mechanism for timepieces," which we have made on August 14, 1896, Serial No. 602,788, and to which attention is directed.

The cyclometer D is likewise provided with an adjustable index D⁵, which is adapted to register the position of the hand D⁶ in its position with relation to its dial D⁷ and can be manipulated in any position around the same by means of the cyclometer-bezel D⁸, which has a loose connection with the cyclometer D for the purpose, and which arrangement is intended to indicate any fraction of a mile, as expressed by the position of the hand D⁶ around over the dial D⁷ of the cyclometer D. The main dial D⁷ of the cyclometer and an auxiliary bezel-dial D⁹ are graduated in sixtieths (60ths) of a circle and which are adapted to indicate fractions of one-sixtieth ($\frac{1}{60}$th) of a mile each as well as other and larger fractions of a mile. The graduations of the cyclometer-dials into sixtieths (60ths) of a circle are also for the purpose of indicating and obtaining the rate of speed in miles per hour in connection with the use of the timepiece A, as will be explained more fully hereinafter. The cyclometer D is also provided with an auxiliary-index-wheel device D¹⁰, by means of which the position of the main-index wheels D¹¹ D¹¹ D¹¹ may be properly indexed, and so that distances in units of a mile or more may be determined, as will be explained hereinafter.

The construction and purposes of a cyclometer provided with auxiliary-index mechanism can be more fully understood by reference to another application for Letters Patent for an improvement in "Auxiliary-index mechanisms for cyclometers," which we made on August 27, 1896, Serial No. 604,130.

The carrier B is provided with a pawl B¹¹, which is pivoted to the carrier B by means of the screw B¹², and its front end B¹³ is adapted to engage with a detent C³, which projects from the base-plate C for the purpose. The movement of the pawl B¹¹ is limited to the positions indicated by the dotted lines in Fig. 1 and which is substantially from the line it registers with the detent C³ inwardly until it strikes against the timepiece A, and which movement is limited by reason of its contact with the side of the timepiece and on account of the inner end B¹⁴ impinging against the finger B⁴ of the carrier B, as indicated in Fig. 3. The pawl B¹¹ is held in an engaging position with the detent C³ by the action of the pawl-spring B¹⁵, one end of which is secured to the slotted finger B⁹ of the carrier B by means of the screw B¹⁶, as seen in Fig. 2, and its other end B¹⁷ exerting its pressure outwardly against the outer end B¹³ of the pawl B¹¹. A tongue B¹⁸ extends upwardly from the front end B¹³ of the pawl B¹¹ and by means of which it can be manipulated with the thumb when the timepiece is to be rotated for the purpose of stopping the latter and when the cyclometer is to be thrown out of gear connection with the cycle-wheel mechanism. The object of the pawl device is to secure the gear connection between the cyclometer and cycle-wheel whenever it is to be made, and thus prevent any accidental disconnection that might happen between the two (2) mechanisms respectively if some such appliance were not provided. The pawl B¹¹, with its tongue B¹⁸, is substantially similar in principle and operation to a door thumb-latch and can be understood without further description. Whenever the pawl is pressed inwardly and the carrier B, with the timepiece A, is rotated in a left-handed direction—that is, so as to be the reverse of that in which the hands of the timepiece move—the pawl passes around between the detent C³ and the timepiece A and with the latter in its movement and to the position indicated by the dotted lines in Fig. 1 and in which position the movement of the timepiece is stopped and the cyclometer thrown out of gear with the cycle-wheel mechanism and becomes consequently stopped as well. A reverse movement of the timepiece with its carrier from the position just described—that is, the "stopped" position—will again start the timepiece, throw the cyclometer into gear with the cycle-wheel mechanism again, and thus start its mechanism into motion and also cause the pawl to resume its normal position in contact with the detent, thereby locking the cyclometer into gear connection with the cycle-wheel mechanism, and all being simultaneously accomplished by a simple right-handed manipulation of the timepiece with its carrier. In practice the manipulation of the whole mechanism can be effected in this direction—that is, when the timepiece and the cyclometer are to be started—by means of the manipulation of the stem portion of the timepiece alone, which serves the purpose of a handle, and when the operation is to be reversed the thumb of the operator naturally comes against the tongue of the pawl and presses the latter inwardly, so that the latter clears the detent and allows the left-handed or "stopping" manipulation to be given to the whole device.

In the drawings the gear connection between the cycle and the clyclometer mechanism is shown as consisting of a single shaft or rod which communicates the movement of the cycle-wheel to the cyclometer mechanism and as arranged is substantially upon one side of the cycle brake mechanism whenever the latter is applied to the handle-bar and main front upright tube of the cycle, and which brake mechanism has been omitted from the drawings for purposes of clearness of illustration; but many cycles either have no such constructed brake devices or else are provided with brakes that are actuated by the foot of the rider and which come in the rear of the main upright. Hence the connection as shown in Fig. 5 does not prevent the application of a brake mechanism to a cycle. When, however, it would be thought preferable to otherwise construct the connection between the cycle-wheel and the cyclometer as arranged upon the handle-bar, this can be effected by making a gear-shaft in two (2) sections, the upper one of which could be arranged so as to pass through the main front post or tube of the cycle and through the handle-bar, as indicated by the dotted lines in Fig. 5, and motion transmitted from the lower section of the gear-shaft to the upper section thereof by means of gearing, as indicated by the dotted lines at the crotch of the front fork of the cycle. The effect of such a construction would be that the upper section of the shaft would be concealed from view and the front cycle-wheel, with the fork and handle-bar mechanism, could be swiveled completely around without injury to the gear-shaft and which otherwise could not be done. A longitudinal adjustment can be provided for the gear-shaft by means of a sleeve-coupling, as indicated by the dotted lines in Fig. 5 at E⁶, and which can be understood without further description.

The whole device is attached to the cycle by means of clips G G', each of which is provided with screws G² G³, which connect the base-plate C with the handle-bar H, as seen in Figs. 4 and 5.

It can also be understood that our improved device can be applied to any other suitable part of a cycle as well as to the handle-bar, and that it would be only necessary to construct a modification of the gear-shaft mechanism or any other mechanism that would be thought preferable to transmit the movement from a wheel of a cycle to which our device was to be applied to make our improvement applicable and serviceable.

The operation of our invention will now be explained. Having a cycle provided with our improved device, as described, we will assume that a rider wishes to determine the time required to travel a certain distance—say, for instance, a quarter of a mile. The timepiece is thrown into the left-hand or "stopped" position indicated by the dotted position of the timepiece with its carrier mechanism and that of the cyclometer as indicated in Fig. 1. This movement stops the timepiece, as well as the operation of the cyclometer, and may be made either beforehand or while the operator is riding on the cycle and approaching the starting-point of the distance to be "timed." The index of the cyclometer is brought into registering position with the hand, as seen in Fig. 1, and which manipulation brings the zero of the bezel-dial thereon, as marked by the star, in register with the hand of the cyclometer, and from which point the quarter-mile register on the cyclometer is to be observed. The indexes upon the timepiece are similarly arranged with reference to the hands thereof, so as to register their respective positions and bring the zero-points of its respective auxiliary dials in conjunction therewith. Now, having the cyclometer and timepiece thus arranged or "set" and the point of distance to be measured from having been reached, the operator throws the timepiece into the position as shown by the full lines in Fig. 1. This movement starts the timepiece, throws the cyclometer into gear connection with the cycle-wheel gearshaft, and causes the cyclometer to commence registering the distance under consideration, and all being done simultaneously, which is necessary for an accurate measurement of the time to be noted. The rider now observes the approach of the cyclometer-hand to the quarter-mile mark upon the auxiliary dial of the cyclometer, and which is marked "15" (fifteen-sixtieths of a mile), and when the hand has reached the mark, as indicated by the dotted position of the hand, the timepiece is reversed, so as to stop its movement, and consequently the movement any further of the hands thereof, as well as the movement of the cyclometer mechanism. The new position of the hands upon the timepiece with reference to the auxiliary indexes would then indicate the exact time that had elapsed while the rider was going the quarter-mile distance thus measured, and the test would be made in a simple and exact manner and necessitating little or no calculation other than that involved in taking the reading from the timepiece, and which could be done in a direct manner on account of the graduations and index mechanism provided thereon. If a greater distance than a quarter of a mile is to be timed, this can be likewise accomplished by manipulating the auxiliary-wheel devices of the cyclometer so as to register with the starting-figures of the main wheels, which indicate a mile or more, and in connection with the auxiliary index, which registers, with the hand of the cyclometer, fractions of a mile. In this case the reading of the time upon the timepiece would be substantially the same as in the quarter-mile test, only, of course, the length of time will be correspondingly greater. When the time involved is a matter of more than an hour, the register should be made with the hour and minute hands, respectively, while the seconds-hand can be made to start from the regular zero-point of the main dial. Moreover, the timepiece, if provided with additional indexes, can be utilized to effect this purpose as well. If the conditions above described had to be reversed—that is, we will say, it is desired to ascertain the distance that can be made in any time—say, for instance, one minute—the hands and index devices of the timepiece and cyclometer would be first arranged as described in the time-test already explained. Now we will suppose that the time to be tested is one minute. The hands being in the position shown in Fig. 1 and the seconds-hand of the timepiece having indicated the elapse of a minute by its complete revolution around the dial to the auxiliary index therefor, the whole device is now instantly stopped, and by observation of the position of the hand on the cyclometer, which we will, for instance, say has assumed the position indicated by the dotted lines thereon and which registers at the "$\frac{15}{60}$" or quarter-mile mark, it will be observed and noted that one-quarter of a mile is the distance that has been traveled in the one-minute interval that has been considered. If the time were more than one minute, the minute-hand, and the hour-hand for that matter, of the timepiece could be used to measure the interval of time to be tested and the auxiliary-wheel-index mechanism could be used in conjunction with the main numeral-wheels of the cyclometer to note the distance over one mile, while the hand and the auxiliary index could be used for the fraction of a mile and in the manner already described in the one-minute test. Now we will assume that the rider wishes to ascertain the speed he can make on an average in one-minute intervals and to know what that speed is at the rate of miles per hour. The hands of the timepiece and that of the cyclometer are indexed by the auxiliary-index devices for each piece of mechanism, respectively, and when the rider is ready to make the test he manipulates the timepiece so as to start it and the cyclometer mechanism in the manner already described in connection with the preceding tests. By observing the complete revolution of the seconds-hand of the timepiece, as indicated by its register, with its auxiliary index, he will know that a minute has elapsed, and at which time he will then stop the further movement of the timepiece. This manipulation will likewise stop the movement of the hand of the cyclometer, as previously described, and the position at which it will then stand will indicate on the auxiliary dial the rate of speed in miles per hour which he has averaged during the minute test which he has just made—say, for instance, that during the minute interval the cyclometer-hand had moved into the position indicated by the dotted line in Fig. 1, and where it registers with the fifteenth (15th) graduation upon the outer or bezel-dial scale of the cyclometer. This would indicate that the rider had traveled at the rate of fifteen miles per hour during the one-minute interval that had been tested, and this result is obtained in a direct reading upon the cyclometer bezel-dial without any mathematical calculations being necessary and constitutes one of the characteristics of a cyclometer-dial when graduated into sixtieths (60ths) of a circle and is one of the advantages of our invention when used in combination with a timepiece upon which one-minute intervals can be measured accurately. It will be observed that on account of the detachable connection made between the timepiece and the carrier device provided therefor the timepiece can be quickly attached to or disconnected from the carrier mechanism and can be used as a portable timepiece—that is, as a watch is worn about the person—when the cycle is not being used or when the cyclometer is to be used alone and without the use of the timepiece as a "timer" in the combined mechanism. It will also be seen that by the application of the cyclometer alone or by the application of our complete combination device to the handle-bar of the cycle we arrange the same in the most convenient, accessible, and observable position possible to a cycle-rider, and which is very advantageous also. Finally, it will be seen that we provide a simple, complete, and effective apparatus by means of which all of the requisite factors to be determined in cycle-riding can be ascertained—namely, the time in making any distance, the distance made in any given time, and the speed in short time intervals of one minute, each at a rate that is most familiar for consideration and calculation—namely, in miles per hour—and which together constitute all that is required in calculations relating to the use of cycles or other devices adapted for carriage purposes or the like, and on account of the convenient arrangement of the device upon the handle-bar of the cycle, where it can be easily manipulated and the readings thereon made clearly visible and notable, it can be used by riders in timing or speeding themselves when riding at high speed and as a substitute or an equivalent for a "pacemaker," as usually required under such circumstances.

Having thus described our invention, what we claim, and desire to secure by Letters Patent, is—

1. A combined timepiece and cyclometer mechanism, consisting of a timepiece which is provided with a carrier device by means of which the rotary pivoted connection is made therefor with a base-plate, a cyclometer also having a pivoted connection with the base-plate, and the carrier device, and the cyclometer, having a slotted-finger and pin connection, respectively, with each other, so that the movement of the carrier will simultaneously transmit motion to the cyclometer and bring its gear mechanism into engagement with the gearing, through which motion is transmitted from the cycle-wheel to the cyclometer, substantially as specified.

2. In a combined timepiece and cyclometer device, a base-plate to which a cyclometer mechanism and a carrier for a timepiece are pivotally connected, and which is provided with a bearing for the gear mechanism through which motion is transmitted from the cycle-wheel to the cyclometer and having fingers adapted to engage with the stop mechanism of the timepiece, a carrier pivotally connected with the base-plate, as aforesaid, being provided with spring-fingers which are adapted to grasp and hold the timepiece, and having a slotted finger adapted to engage with a corresponding stud in the cyclometer and through which movement is transmitted to the latter and thereby cause it to engage with the gear mechanism aforesaid and cause the operation of its index mechanism, substantially as specified.

3. In a combined timepiece and cyclometer device, the combination of the cyclometer and a timepiece-carrier, and the base-plate to which the cyclometer and timepiece-carrier are pivotally connected, and the carrier having a pawl mechanism adapted to engage with a detent secured to the base-plate, so as to lock the cyclometer in gear with the gear mechanism communicating with the cycle-wheel, substantially as specified.

4. In a combined timepiece and cyclometer device, a cyclometer having a gearing through which motion is imparted to its indicating devices and having a pivot upon which a rotatable movement may be given thereto, and a stud by which the rotatable movement may be imparted thereto, a timepiece-carrier having spring-fingers adapted to grasp and secure therein the timepiece, and having a slotted finger adapted to engage with the stud in the cyclometer so as to impart motion to the cyclometer therethrough, and having a pawl device adapted to lock the cyclometer in gear with the cycle-wheel, and a base-plate, having bearings for the pivots of the cyclometer and carrier devices, a bearing for the gearing, which transmits the movement of the cycle-wheel to the cyclometer, and having a detent with which the pawl engages when the cyclometer is in gear with the cycle-wheel gearing, and having fingers adapted to engage with the stop device of the timepiece, when the latter is in position in the carrier, and having a clip device by which the whole mechanism may be attached to the handle-bar of the cycle, or other suitable portion thereof, substantially as specified.

5. A combined timepiece and cyclometer device for cycles, consisting of a timepiece, A, a cyclometer, D, a base-plate, C, to which the timepiece and the cyclometer are connected, and having a carrier mechanism, B, connected therewith which is adapted to give a starting and stopping effect to the timepiece and the cyclometer mechanisms, and the rod, $E^2$, having a connection with the front wheel of the cycle, and a separable gear connection with the cyclometer, and through which, motion is communicated from the cycle-wheel to the cyclometer, and all being combined substantially as specified.

Signed at New York, in the county of New York and State of New York, this 24th day of August, A. D. 1896.

THOMAS F. GAYNOR.
WM. A. WASHBURNE.

Witnesses:
C. M. HILLMAN,
A. A. GREENHOOT.